INVENTOR.
HAROLD ISAACS
BY
ATTORNEYS

April 5, 1966

H. ISAACS 3,244,310

DETACHABLE CARGO BODY AND VEHICLE WITH
ELEVATING MECHANISM FOR SAME

Filed Nov. 21, 1961

INVENTOR.
HAROLD ISAACS

BY

ATTORNEYS

April 5, 1966
H. ISAACS
3,244,310
DETACHABLE CARGO BODY AND VEHICLE WITH
ELEVATING MECHANISM FOR SAME
Filed Nov. 21, 1961
3 Sheets-Sheet 3
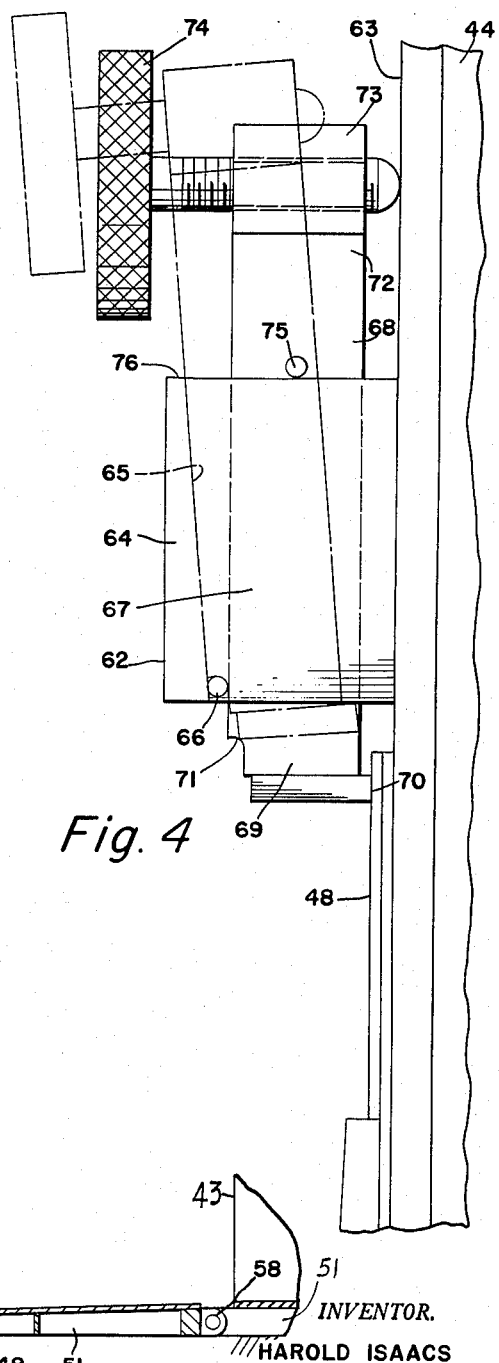
Fig. 4
Fig. 5
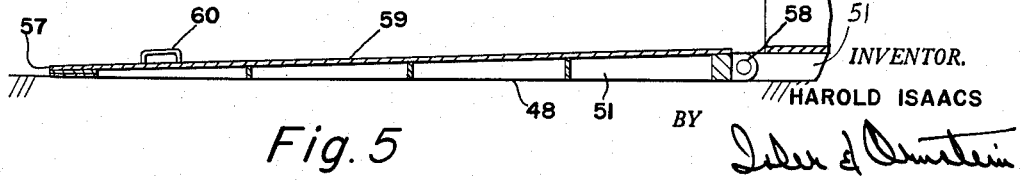
INVENTOR.
HAROLD ISAACS
BY
ATTORNEYS

United States Patent Office 3,244,310
Patented Apr. 5, 1966

3,244,310
DETACHABLE CARGO BODY AND VEHICLE WITH ELEVATING MECHANISM FOR SAME
Harold Isaacs, University Heights, Ohio, assignor to Edith Isaacs, University Heights, Ohio
Filed Nov. 21, 1961, Ser. No. 153,975
1 Claim. (Cl. 220—1.5)

The present invention relates generally to material or cargo handling vehicles, and more particularly to a cargo vehicle or truck having a load-carrying body releasably carried by the truck and adapted to be elevated and lowered relatively to the loading level.

It is a primary object of my invention to provide a cargo carrying vehicle with a detachable body which can be loaded at ground level or dock level, either apart from the vehicle or associated with the vehicle, which body can be transported to destination and unloaded at ground level or at higher levels.

A further object of my invention is to provide a detachable cargo body or container which, in relation to the legal limits on over-the-road dimensions, will have greater payload capacity than existing cargo bodies.

Still another object of my invention is to provide a light, yet rigid and sturdy, cargo body which utilizes its loading gate as a structural member.

Other objects and advantages of my invention will be apparent during the course of the following description.

In the accompanying drawings forming a part of this specification and in which like numerals are employed to designate like parts throughout the same.

FIG. 4 is a sectional view of the clamping device which is utilized for securing the gate of the cargo body in closed position.

FIG. 5 is a sectional view of the gate of the container in its open position for service as a loading ramp.

Figure 1:
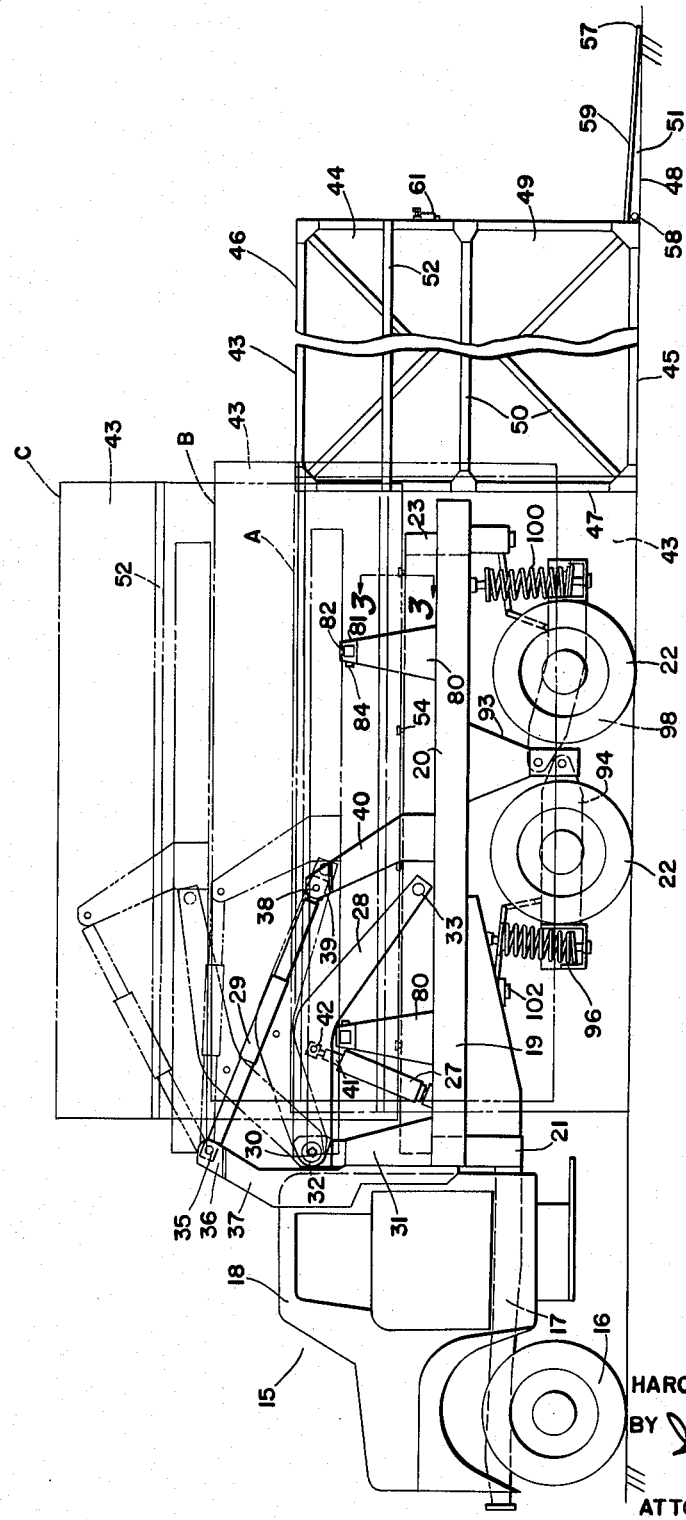
FIG. 1 is a side elevation of a vehicle embodying elevating and support mechanism of my invention, with a cargo body or container shown detached from the vehicle for loading.
Figure 2:
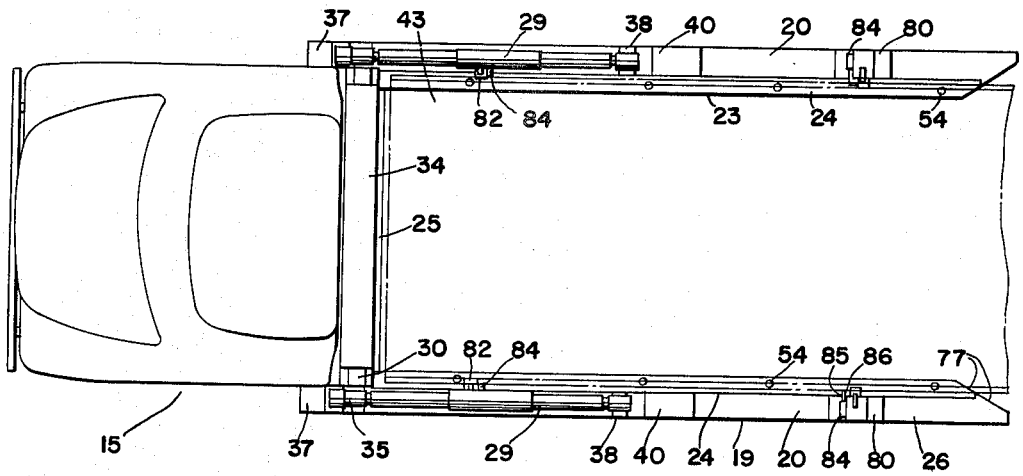
FIG. 2 is a top plan view of the vehicle of FIG. 1 with the container shown in phantom outline in transport position.

Referring more particularly to FIGS. 1 and 2 of the drawings, I have shown, in general outline, a prime mover 15, which is of the capacity and character ordinarily employed in trucks or tractors for transporting cargo. The front wheels 16 of the truck are the driving wheels, in contrast to the rear wheel drive usually employed in tractors and trucks of this type. A suitable sub-frame assembly 17 underlies the cab unit 18 and is rigidly joined, by welding or the like, to an elevated fixed frame 19, which extends rearwardly of the cab unit 18 in a substantially horizontal plane.

The fixed frame 19 is U-shaped in design with the longitudinally-extending side members 20 being rigidly secured to a cross-member 21 which forms the base of the U closely adjacent to the rear of the cab unit 18. The frame 19 is open at its rear (the top of the U) and defines an unobstructed, clear passage for horizontal movement of a body between the side members 20 toward the cross-member 21. The frame 19 is supported above ground level by tandem wheels 22 which are positioned approximately midway relatively to the length of frame 19.

The fixed frame 19 supports elevating mechanism for a lifting frame 23 having longitudinally-extending side members 24 rigidly secured to a cross-member 25 at the forward end of the frame 23. The frame 23 is of U-shape design and conforms substantially to the outline shape of the fixed frame 19, although it is somewhat narrower in its external width than the frame 19. This results primarily from the fact that the side members 24 of the lifting frame 23 are of narrower width than the side members 20 of frame 19. The frame 19, thus lies in the path of movement of the frame 23 and underlies it while providing a peripheral surface area 26 on which the components of the elevating mechanism can be mounted without obstructing the abutment of the frame 23 on the frame 19. The side members 20 of frame 19 define an overall width equal to the legal width limit for highway use, now 96". The width of each individual frame member 20 is no greater than the width of the underlying wheel and suspension member. The inboard edges of the lifting frame side members 24 coincide with the like edges of members 20, however, this edge relationship is not mandatory.

The lifting frame 23 is hydraulically actuated in its slightly arcuate vertical movement by a pair of hydraulic cylinders 27 which act upon a parallelogram linkage consisting of a pair of lower lifting links 28 cooperably associated with a pair of upper stabilizing compression-tension links 29. It will be understood that the structure and mechanism embodied on one side of the vehicle is duplicated on the opposite side of the vehicle, so that it will hereafter suffice to describe only one side of the vehicle.

The container or cargo body 43 can be any desired form of tank type, flat-bed type, beverage type load-carrying unit, which may be particularly designed or adapted for a specialized cargo or load, but is here shown as the box or van type of body. The body 43 has sides 44, a bottom 45, a top 46, a fixed end wall 47 and a partial, movable end wall 48 which also serves as an end gate and loading ramp. The body may be made of a suitable material and is here shown made of sheet steel panels 49 joined by welding and suitably reinforced by an arrangement of ribs 50 on the side walls, the top wall and the end wall 47. The load-bearing bottom 45 and the end gate 48 are reinforced more heavily by a gridwork 51 of structural members, as shown in FIG. 5.

The container 43 may have a length greater than the length of the lifting frame 23, although it should not be of such extreme length as to create a condition of imbalance or instability relatively to the support provided by the lifting frame. Preferably, it is of a length which would not cause it to project more than 15% of its length beyond the open end of the lifting frame. It is intended that the containers be furnished in what may be termed "modular" lengths. For example, the vehicle may be designed to accommodate a 15 foot body which would be a "full length" body in this particular instance. Half-length and quarter-length bodies are also provided which would permit the vehicle to carry two half-length bodies or four quarter-length bodies or combinations thereof for cargo-handling conditions in which "containerization" shipment is desirable, but the full length body is too large for the cargo involved. A 30-ft. trailer could accommodate two of such 15 ft. full length bodies, or four half length bodies. The half length bodies could also be positioned in the width of such a trailer which is normally slightly less than 8 ft. wide. Similarly, the "modular" lengths could be accommodated in railway cars without any significant space loss.

The width of the container must be such as to be accommodated within the lifting frame 23 and preferably permit a reasonable clearance, for example, 2 inches overall. It will be understood that highway laws, with respect to the height, width and length of cargo vehicles, place limitations upon the size of the vehicle and the container for over-the-road travel. Therefore, the containers are nominally six feet in width, as herein described, for highway travel and the overall width of the vehicle is eight feet. However, where the vehicle and containers are designed solely for off-highway use, these limitations will not apply. Thus, a very high container could be wider in its upper portion than in the frame-embraced lower portion.

In transport position, indicated by the phantom outline B in FIG. 1, the container 43 is elevated to an intermediate level between ground level, indicated by phantom outline A in FIG. 1, and the maximum elevated position, indicated by phantom outline C in FIG. 1. In the transport position, the bottom 45 of the container may be from 18 to 24 inches above ground level, depending upon the weight of the cargo. The height of the container, for highway travel, must be such as to meet the legal requirements when the container is elevated to transport position. However, inasmuch as the design of the vehicle permits the bottom of the cargo body 43 to be carried about two feet lower than conventional cargo bodies, the container 43 has a greater payload capacity than conventional bodies of like height. This feature also results in a lower center of gravity.

Figure 3:
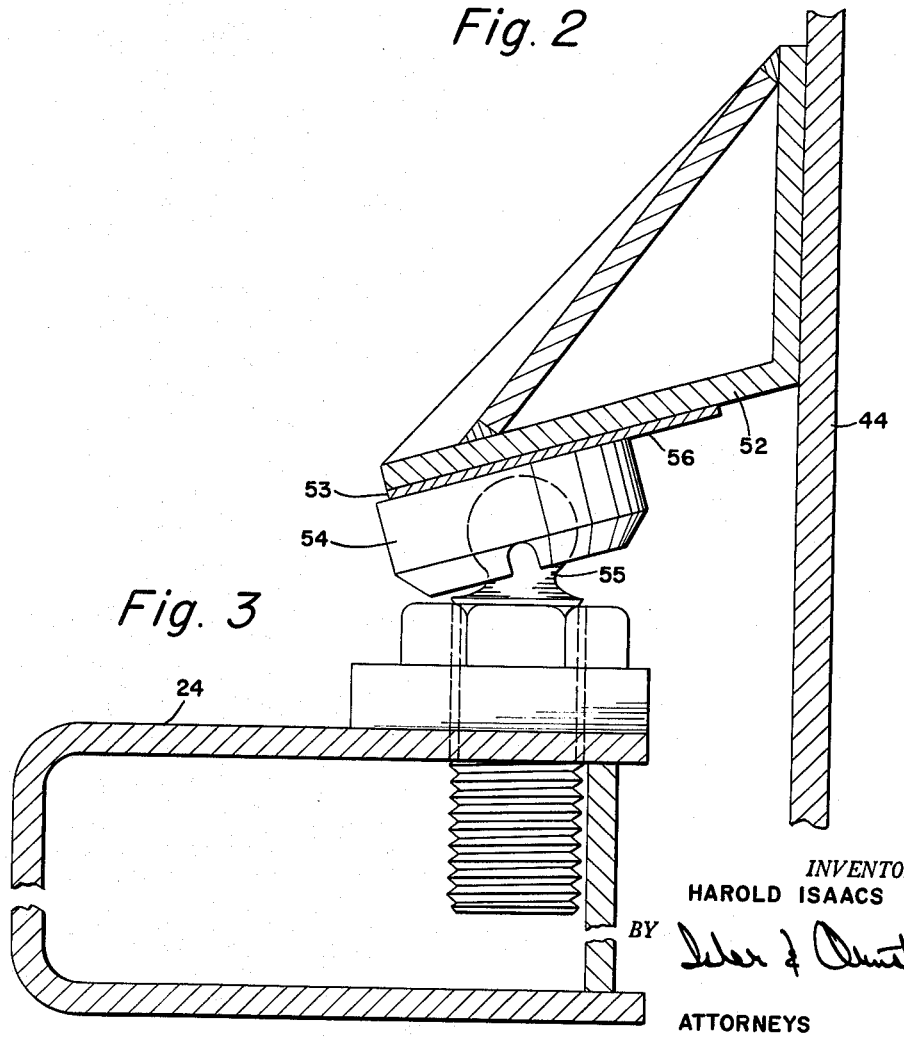
FIG. 3 is a fragmentary sectional view taken on line 3—3 of FIG. 1 and showing details of the means for centering the container on the lifting frame of the vehicle.

The container 43 is provided on the exterior of its side walls with laterally-projecting support means, here shown as a longitudinally extending rail 52 which has an angularly projecting leg portion 52a and a securing leg portion 52b which is fixed in abutment with the side wall 44. The leg portions of the rail may be braced or reinforced by a web element 52c secured between the legs 52a and 52b coextensive with the length of the rail. Further reinforcement or bracing of the rail 52 may be provided at spaced points by transverse plates 52d which are welded or otherwise secured between the leg portions 52a and 52b. The underside of the leg portion 52a may be reinforced at selected points by wear blocks 53. The wear blocks 53 are positioned to engage suitable centering devices on the lifting frame 23. The centering devices are here shown as spaced swivel pads 54 which are mounted for universal movement on the upper surface of the lifting frame side members 24 by means of a height-adjustable ball and socket connection 55 (see FIG. 3). The wear blocks 53 provide a downwardly inclined abutting surface 56 which is disposed at a shallow angle of about 15° to the horizontal plane of the lifting frame 23. When the blocks 53 come to rest upon the complementary disposed surface of the swivel pads 54, the weight of the container 43 and any load therein causes the container to be shifted slightly to one side or the other to a position of equilibrium where it is centered with respect to the lifting frame side members 24. The shallow centering angle is not sufficient to overcome the frictional resistance to movement when the container is on the ground, but permits the centering to occur as the container is elevated. The centering arrangement also imposes a desirable inboard stress on the frame members 24 which tends to overcome any tendency of these members to spread under heavy load.

One of the stated objectives of my invention is to accomplish ground level loading or unloading of cargo. As illustrated in solid lines in FIG. 1, the cargo body 43 may be loaded or unloaded remote from the vehicle. Or, as indicated in phantom outline A, such loading or unloading at ground level may take place while the body 43 is associated with the vehicle. For convenience in such use, the movable end wall or gate 48 of the container serves as a ramp when in its lowered position. The container is so designed that the load carrying surface of the reinforced bottom 45 is only about two inches above ground level when the container is at rest. The reinforcing gridwork 51 on the exterior of the gate 48 is tapered toward the upper edge 57 of the gate, so that when the gate is pivoted about its hinge 58 the interior surface 59 of the gate inclines downwardly from the hinge point to provide a sloping ramp surface whose entry edge 57 is substantially at ground level, as best seen in FIG. 5. Cargo can thus be handled conveniently and easily either manually or using mobile aids such as hand trucks, skid trucks, fork trucks, etc. Handles 60 are provided on the gate or ramp to facilitate the raising or lowering thereof.

The gate 48 not only serves to close the open end of the container and as a loading ramp, but also serves as a structural component of the container. In the absence of a structural component across the open end of the container, there would be a strong possibility of buckling of the walls under load, particularly when a thin wall, weight-saving construction is utilized, as herein disclosed. This possibility can be avoided by the use of heavier walls and reinforcing members, but this would substantially increase container weight and thickness and correspondingly reduce the payload weight which could be carried. In order to rigidly integrate the gate 48 with the side walls 44 of the container and at the same time still permit quick release and securement of the gate, I have provided a novel gate-securing device in the form of a pair of clamps 61, the details of which are shown in FIG. 4.

The clamping device 61 includes a three-sided housing 62 of U-shaped cross-section which is fixedly secured to the edge surface 63 of each side wall 44 at a location closely adjacent and immediately above the upper edge 57 of the closed gate 48. The back wall 64 of the housing 62 presents an inclined downwardly converging interior surface 65 which is traversed adjacent its lower end by a stop or abutment here shown as a rod or pin 66 mounted in the side walls 67 of the housing.

A clamping bar 68 of substantially rectangular cross-section is freely received in the housing and is of sufficient length to provide projecting portions at the opposite end openings of the housing 62. The lower portion 69 provides a clamping face 70 which is adapted to overlie and abut a portion of the gate 48. The lower portion 69 is also provided with a recess or shoulder 71 which can selectively be caused to engage the pin 66.

The upper portion 72 of the bar 68 terminates in a screw-threaded portion 73 of fine pitch for cooperation with a hand screw 74, the end of which is adapted to seat on a portion of the edge surface 63. In order to avoid injury to the screw threads, it is desirable to provide a stop or rest 75 on the bar 68 which will abut the upper edge 76 of the housing 62 when the bar 68 slides downwardly in the housing.

When the gate 48 is open, the bar 68 is in a raised position, shown in phantom view, wherein the shoulder 71 rests upon the pin 66 and the lower portion 69 is thereby retracted or withdrawn so that it is out of the path of pivotal movement of the gate 48. In this raised position, the bar 68 may also rest upon the inclined surface 65 and there is no pressure of the screw 74 on the surface 63.

When the gate 48 is closed, the bar 68 is moved off the supporting pin 66 and permitted to drop in the housing so that the clamping face 70 overlies a portion of the gate. The hand screw 74 is then turned on its seat to force the upper portion 72 of the bar away from the side wall edge 63, the inclined wall 65 providing clearance for this movement. The pin 66 acts as a fulcrum for the long lever arm defined by the upper portion 72 of the bar and its movement is translated into the short lever arm movement of the clamping face 70 against the gate 48. The compounding of force obtained through the combination of the fine pitch screw 74 and the force-multiplying lever exerts a pressure of high magnitude at the clamping face to frictionally integrate the gate 48 with the side walls 44 of the container. The gate thus becomes a significant and vital structural member of the container 43. Despite the high compressive force exerted by the clamp 61, the clamping device is quickly and easily engaged or disengaged manually, yet is free from the problems of close tolerance and accidental release which are associated with conventional toggle clamps or other devices in which deformation of the container in use would create misalignment or lack of registry. Through the stress-transfer means provided by the heavy hinge 58, the vertical position of the gate 48 also acts as a gusset to strengthen and reinforce the bottom 45 of the container 43, independently of the clamping action.

In utilizing my invention, the vehicle is moved rearwardly to bring the cargo body 43 within the lifting frame 23 with the support rail 52 positioned to be properly engaged by the centering devices 54. To aid this operation, angular or beveled faces 77 are provided at the ends of side frame members 20 and 24 to guide the container into position. It will be apparent that the support rail 52 on the container is slightly above the receiving position of the lifting frame when the container is at ground level, as in FIG. 1. The hydraulic cylinders 27 are then actuated to exert an upward thrust on the parallelogram lifting linkage to cause upward movement of the lifting frame into engagement with the container. The load may cause the fixed frame 19 to move downwardly relatively to the wheels 22 and to the lifting frame 23, as the suspension assembly yields to the load. During further upward movement of the lifting frame, the centering devices may be operative to shift the container to a median position, as previously described. The container is elevated to any desired height within the range of vertical travel of the lifting frame, which may be 5–7 feet maximum, for example, as indicated in phantom outline C in FIG. 1.

If the vehicle is being used in short-trip intra-plant service, the container 43 may be transported in its elevated position by merely hydraulically locking the lifting cylinders 27 at the desired position of elevation. At destination, the lifting frame is lowered until the container comes to rest on the ground. The vehicle can stay with the container while it is unloaded or otherwise serviced or, for more efficient utilization, the vehicle would draw away from the container and go elsewhere to service other cargo bodies which require transport. It will also be noted that under certain circumstances the elevated cargo body may be serviced in its elevated position on the vehicle. For example, if the cargo is to be loaded or unloaded at an elevated platform, such as a loading dock, the container can be raised or lowered to a position in which the ramp gate 48 will rest horizontally upon the dock and cargo can then be removed by mobile trucks from the container while the lifting frame supports the container at the desired level.

The structure which I have described, results in material handling apparatus which is extremely versatile in character and efficient in operation. The ground-loading feature permits substantial savings in loading or unloading cargo, even apart from the other features. Inasmuch as the body can be elevated for loading or unloading to surface levels above ground level, I prefer to use the term surface-loading to define the capability of my apparatus to bring the cargo body and the load to a common service level.

The detachability feature permits efficient use of the vehicle as the cargo bodies can be serviced independently of the presence of the vehicle, so that the vehicle can be utilized for its primary purpose of cargo transportation, rather than standing idle while loading or unloading of the cargo occurs. This feature also permits interchangeability of cargo bodies of various conventional styles with special-purpose bodies, so that the versatility of the vehicle is enhanced.

The apparatus, by its ability to simultaneously handle multiple sizes of bodies in various combinations, also permits containerization practices to be utilized so that smaller unit loads will not have to be comingled with other loads in a single large cargo body.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claim.

Having thus described by invention, I claim:

In a detachable cargo body, the combination of a bottom providing a substantially horizontal load-bearing surface, upright side walls rigidly connected to said load-bearing surface, an end gate providing a reinforcing plate extending transversely to said load bearing surface, stress-transfer means connecting said plate to said load-bearing surface, said stress-transfer means comprising a pivotal connection between said plate and said load-bearing surface, and releasable securing means carried by said side walls and structurally integrating said plate to said side walls, said securing means also retaining said plate against pivotal movement, said securing means comprising a housing, a lever slidably received in said housing and projecting therefrom, a clamping face provided at one extremity of said lever, said lever being slidable to project said clamping face over said plate, and a force-compounding actuating element operatively engaging the opposite extremity of said lever to cause compressive movement of said clamping face relatively to said plate.

References Cited by the Examiner

UNITED STATES PATENTS

| | | | |
|---|---|---|---|
| 1,408,383 | 2/1922 | Mosel | 294—68 |
| 1,542,468 | 6/1925 | Mueller | 292—67 |
| 1,740,000 | 12/1929 | Andrews et al. | 220—1.5 |
| 1,766,507 | 6/1930 | Coe | 294—68 |
| 1,773,982 | 8/1930 | Fitch | 220—1.5 |
| 2,540,698 | 2/1951 | States | 220—1.5 |
| 2,547,269 | 4/1951 | Kinsey | 214—390 |
| 2,934,228 | 4/1960 | Hillberg | 214—390 |
| 2,936,916 | 5/1960 | Dempster | 214—621 |
| 2,972,430 | 2/1961 | Johnson | 220—1.5 |

FRANKLIN T. GARRETT, *Primary Examiner.*

GERALD M. FORLENZA, *Examiner.*